No. 730,457. PATENTED JUNE 9, 1903.
H. W. HOWE.
FISHING REEL DRAG.
APPLICATION FILED JUNE 28, 1902.
NO MODEL.

Henry W. Howe, Inventor,

By E. G. Siggers,
Attorney

Witnesses
Howard L. Orr.
Louis G. Julihn

No. 730,457. Patented June 9, 1903.

UNITED STATES PATENT OFFICE.

HENRY W. HOWE, OF MEXICO, MEXICO.

FISHING-REEL DRAG.

SPECIFICATION forming part of Letters Patent No. 730,457, dated June 9, 1903.

Application filed June 28, 1902. Serial No. 113,646. (No model.)

*To all whom it may concern:*

Be it known that I, HENRY W. HOWE, a citizen of the United States, residing in the city of Mexico, Republic of Mexico, have invented a new and useful Fishing-Reel Drag, of which the following is a specification.

This invention relates to improvements in fishing-reels, and has for its object to equip a reel with an automatic drag resisting the rotation of the reel in one direction to prevent overrunning and tangling of the line and disposed to be automatically released when the reel is rotated in the opposite direction to wind in the line.

It is also the object of the invention to provide the automatic drag with means whereby it may be held inoperative by the angler to permit the free running of the line—as, for instance, in casting—when it is not desired to impose a drag upon the reel for the purpose of playing and breaking down the fish.

A still further object of the invention is to provide a manually-operated brake for stopping the reel entirely or for opposing a greater resistance thereto when the resistance opposed by the drag is insufficient.

Other objects of the invention subordinate to those enumerated and various novel features of construction will appear during the course of the succeeding description of that form of the invention which for the purposes of this application is illustrated in the accompanying drawings and embraced within the scope of the appended claims.

Figure 3:
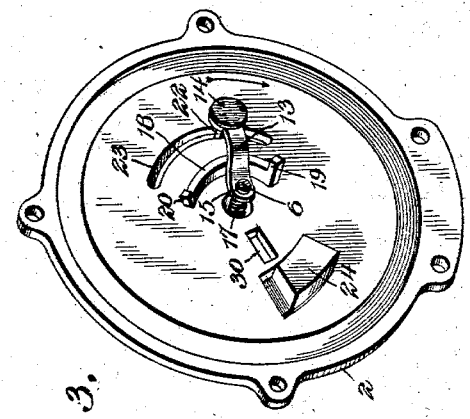
Figure 4:
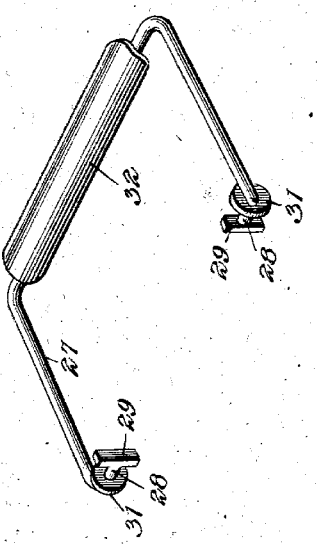
Figure 1:
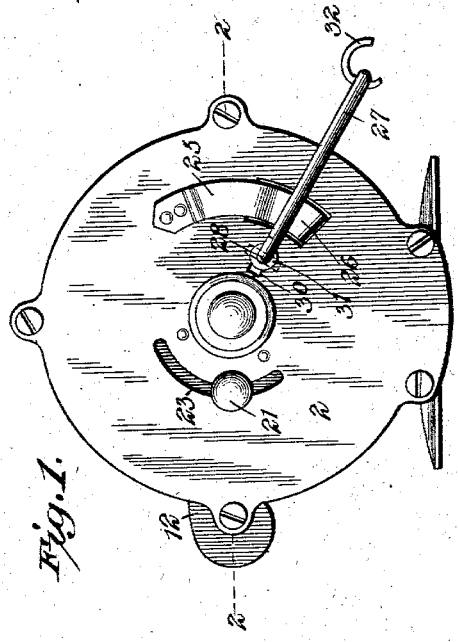
Figure 2:
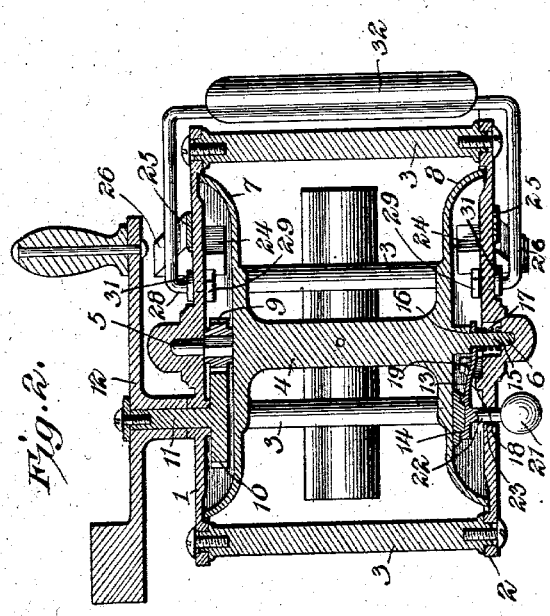

In said drawings, Figure 1 is a side elevation of a reel equipped in accordance with my invention. Fig. 2 is a sectional view on the line 2 2 of Fig. 1. Fig. 3 is a perspective view of one of the frame-plates, showing the drag and one of the brake-shoes; and Fig. 4 is a detail perspective view of the brake-frame.

Like numerals of reference are employed to designate corresponding parts throughout the several views.

The frame of the reel comprises, as usual, the frame-plates 1 and 2 and the intermediate transverse posts 3, which latter retain the plates in spaced relation. Within the frame is disposed the line-spool 4, having trunnions 5 and 6, afforded bearings in the plates 1 and 2. The heads 7 and 8 of the spool are dished in the usual manner to accommodate various working parts between the frame-plates and the ends of the spool. For instance, between the plate 1 and the adjacent head 7 the trunnion 5 is provided with the small gear-wheel 9, meshing with a somewhat larger gear-wheel 10, carried by the inner end of a shaft 11, extended through the plate 1 and provided with the usual operating-crank 12, by means of which the reel is rotated to wind in the line.

The aggroupment of elements thus far described is common in the art, but in accordance with my present invention is supplemented by an automatic drag mechanism located between the spool-head 8 and the plate 2. This mechanism comprehends a drag-spring 13, provided at one end with a drag-shoe 14 and having its opposite end apertured for the reception of the reduced end 15 of the trunnion 6. The reduction of the trunnion 6 produces a shoulder 16, into frictional contact with which the drag-spring 13 is urged by a spiral spring 17, encircling the reduced end of the trunnion and bearing at its outer end against the frame-plate 2, preferably provided with a recess for its reception.

Normally the spring 13 is swung back toward the frame-plate 2 to retain the drag-shoe 14 out of contact with the spool; but when said spool is rotated in a direction to unwind the line said spring by reason of its frictional engagement with the shoulder 16 of the trunnion 6 will be moved along the face of an arcuate cam 18 in the direction of the arrow in Fig. 3. The cam 18 is rigidly attached to or integral with the plate 2 and is provided with stop-lugs 19 and 20 at its opposite ends. When the drag-spring is swung in the direction of the arrow in Fig. 3 by the rotation of the spool, said spring will travel up the inclined face of the cam 18 until the shoe 14 contacts with the head 8 of the spool. The frictional connection between the spring and the trunnion will now be augmented by the frictional connection between the shoe and the spool, and the spring will be swung farther up the incline of the cam to urge the drag-shoe more securely against the head of the spool for the purpose of opposing a material drag to the rotation of the latter. Thus it will be observed that the drag is automatically applied to the reel, and it will be noted that upon the rotation of the spool in the opposite direction by means of the operating-crank 12 the drag-spring will be moved back toward the opposite end of the cam and will spring back sufficiently to move the drag-shoe out of contact with the spool. Thus the drag is automatically applied when the reel is rotated in one direction to unwind the line and is automatically released when the spool is rotated in the opposite direction to wind in the line. It is necessary, however, to prevent the automatic application of the drag to permit casting or free running of the line under other conditions of use. The spring 13 is therefore connected to a finger-piece or button 21, located upon the exterior of the frame and having a shank 22 passed through an arcuate slot 23 in the plate 2. By the manipulation of this button in an obvious manner the swinging of the drag-spring and the application of the drag to the spool may be prevented, or the drag may be released if after its automatic application it is desired to provide for the free running of the line.

While the automatic drag mechanism described is capable of use in any character of reel, either alone or in connection with other spool-retarding devices, I prefer to associate therewith a simple and effective brake mechanism comprising brake-shoes 24, projecting through the frame-plates for engagement with the spool-heads and carried by the free ends of springs 25, riveted or otherwise secured to the outside faces of the plates and bent to provide inclined faces 26. These brake-shoes are designed to be thrown into contact with the spool-heads by a swinging brake-frame 27, having the form of a yoke, the side bars of which when depressed will ride upon the inclined faces 26 of the springs to urge the brake-shoes 24 inwardly against the opposite ends of the spool. The attachment of the yoke to the frame is effected by bending the ends 28 of the side bars of said yoke and by forming said ends with keeper-blocks 29, disposed at right angles to the side bars. (See Fig. 4.) In attaching the yoke the latter is disposed in position to permit the keeper-blocks 29 to pass through radial slots 30 in the plates 1 and 2, and the yoke is then swung down to its operative position (see Fig. 1) to present the blocks 29 at right angles to the slots 30. When the yoke is in this its normal position, its detachment is prevented, and it is free to be swung for the purpose of urging the brake-shoes inwardly in the manner already stated.

When the disorganization of the parts is desired, it is simply necessary to swing the yoke for the purpose of presenting the keeper-blocks 29 into coincidence with the slots 30, when, as will be obvious, the blocks may be drawn through the slots and the yoke detached from the frame.

If desired, the ends 28 of the yoke may be provided with bearing-disks 31, disposed to bear against the outer sides of the plates 1 and 2, and the cross-bar of said yoke or frame is preferably provided with a finger-plate 32, as shown in Fig. 4.

Briefly, the operation of the device is as follows: Assuming that the angler desires to make a cast, the finger-piece 21 is held by the operator to prevent the application of the drag to the spool as the line is unwound therefrom. The finger-piece is then released, and upon the hooking of a fish the movement of the line-spool will cause the drag-spring 13 to be moved up the cam 18 to effect the application of the drag. Considerable resistance will now be opposed to the unwinding of the line, and the drag will therefore materially assist in breaking down the fish. When the fish has been broken down and the angler desires to reel in the line, the spool is rotated in the opposite direction by the movement of the crank 12, and the frictional connection between the spool and the drag will cause the latter to be moved down the cam 18 until the drag is moved entirely out of contact with the spool. The drag will therefore be automatically released to permit the free rotation of the spool whenever the latter is rotated in a direction to wind in the line. In the event that the drag opposes insufficient resistance to the rotation of the spool the brake may be applied by depressing the brake-frame or yoke to effect the inward movement of the brake-shoes 24 and the frictional engagement thereof with the heads of the spool, the springs 25 serving to retract the brake-shoes whenever the pressure is removed from the brake-frame.

It is thought that from the foregoing the construction and operation of my novel fishing-reel drag will be clearly apparent; but while the illustrated embodiment of the invention is believed at this time to be preferable I wish to be distinctly understood as reserving to myself the right to effect such changes, modifications, and variations of the illustrated structure as may be properly embraced within the scope of the protection prayed.

What I claim is—

1. In a fishing-reel, the combination with a frame and line-spool, of a drag-shoe normally out of engagement with the spool, an operative connection between the spool and drag-shoe to effect the movement of the drag when the spool is operated in one direction, means for automatically moving the drag into engagement with the spool when the drag is operated by the spool, and a finger-piece located upon the exterior of the frame and connected to the drag, whereby the angler is enabled to hold the drag in its released position to facilitate the casting of the line.

2. In a fishing-reel, the combination with a frame and a line-spool, of a drag-spring mounted to swing and carrying a drag-shoe, means for urging the spring toward the line-spool as said spring is swung, means for effecting the automatic swinging of the spring through the movement of the line-spool to effect the presentation of the shoe to the spool, and manually-operated means for moving the spring or retaining the same against movement.

3. In a fishing-reel, the combination with a frame and line-spool, of a drag-spring mounted to swing and carrying a drag-shoe, a cam disposed to contact with the spring to urge the shoe toward the spool, means for automatically swinging the spring as the line-spool is rotated in one direction to effect the presentation of the shoe to the spool, and a finger-piece connected to the spring and extended to the exterior of the frame.

4. In a fishing-reel, the combination with a frame and line-spool, of a drag-shoe normally out of contact with the spool, and means for automatically moving the shoe into contact with the spool when the latter is rotated in one direction.

5. In a fishing-reel, the combination with a frame and line-spool, of a drag-shoe normally out of contact with the spool, a drag-spring carrying the shoe and having frictional engagement with the spool to be moved thereby, and means for urging the shoe into contact with the spool as the spring is moved by the latter.

6. In a fishing-reel, the combination with a frame and line-spool, of a drag-shoe normally out of contact with the spool, a drag-spring carrying the shoe, means for moving the spring through the rotation of the spool, and a cam to flex the spring toward the spool as said spring is moved to effect the presentation of the shoe to the spool.

7. In a fishing-reel, the combination with a frame and line-spool, of a drag-shoe, a spring carrying the drag-shoe at one end and having frictional engagement at its opposite end with the line-spool to be moved by the latter, and a fixed cam disposed in the path of the spring to flex the same toward the line-spool as the spring is moved by said spool.

8. In a fishing-reel, the combination with a frame, and a line-spool having trunnions journaled in the frame, of a spring carried by one of the trunnions, a drag-shoe carried by the spring, and means for urging the spring toward the line-spool, as said spring is moved by reason of its frictional contact with the trunnion.

9. In a fishing-reel, the combination with a frame, and a line-spool having trunnions journaled in the frame, one of said trunnions being shouldered, of a drag-spring supported at one end upon the shouldered trunnion, a spring disposed to urge the drag-spring into frictional contact with said shoulder, a shoe carried by the free end of the drag-spring, and a fixed cam disposed to flex the spring toward the spool as said spring is moved by the latter.

10. In a fishing-reel, the combination with a frame, and a line-spool provided with trunnions, of a drag-spring having an operative frictional connection at one end with one of the trunnions, a drag-shoe carried by the other end of the spring, a cam fixedly mounted on the frame and disposed to urge the spring toward the spool when said spring is moved in one direction, and a finger-piece projecting from the spring to permit the manual actuation thereof.

11. In a fishing-reel, the combination with a slotted frame, and a line-spool, of brake-shoes extended through the frame to engage the opposite ends of the line-spool, a brake-frame having inturned ends passed through the slots in the reel-frame and provided with terminal keepers, and means for moving the brake-shoes through the medium of the brake-frame.

12. In a fishing-reel, the combination with a frame comprising connected frame-plates having radial slots, of a line-spool mounted in the frame, brake-shoes extended through the frame-plates to engage the line-spool, springs supporting the brake-shoes and secured to the outer faces of the frame-plates, said springs being provided with inclined faces, a brake-frame having side bars opposed to the inclined faces of the springs and provided with inturned ends passed through the slots in the frame-plates, and keeper-blocks mounted at the inner extremities of said inturned ends and designed to prevent the withdrawal of said ends from the frame until the keeper-blocks are brought into coincidence with the slots in the frame-plates.

In testimony that I claim the foregoing as my own I have hereto affixed my signature in the presence of two witnesses.

HENRY W. HOWE.

Witnesses:
FENTON R. MCCREARY,
C. E. FUENTEVILLE, Jr.